United States Patent
Tomita et al.

(10) Patent No.: US 6,606,877 B2
(45) Date of Patent: Aug. 19, 2003

(54) VEHICLE AIR CONDITIONER THAT OPERATES DURING ENGINE STOPS

(75) Inventors: Hiroyuki Tomita, Nagoya (JP); Yuichi Shirota, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/300,181

(22) Filed: Nov. 20, 2002

(65) Prior Publication Data
US 2003/0097852 A1 May 29, 2003

(30) Foreign Application Priority Data
Nov. 26, 2001 (JP) ........................................ 2001-359586

(51) Int. Cl.⁷ ................................................. B60H 1/32
(52) U.S. Cl. ............................ 62/244; 165/10; 165/236
(58) Field of Search ................................ 62/244, 323.1, 62/10; 126/400; 165/42, 43, 10, 236

(56) References Cited

U.S. PATENT DOCUMENTS

| | | | | |
|---|---|---|---|---|
| 3,977,490 A | * | 8/1976 | Flaig ............................ | 165/41 |
| 4,761,967 A | * | 8/1988 | Sumikawa et al. ............ | 62/201 |
| 5,768,908 A | * | 6/1998 | Tanaka et al. ................. | 62/332 |
| 6,112,543 A | * | 9/2000 | Feuerecker et al. ........... | 62/430 |
| 6,330,909 B1 | * | 12/2001 | Takahashi et al. ........... | 165/202 |
| 6,418,857 B1 | * | 7/2002 | Okano et al. ................. | 104/281 |
| 6,427,472 B1 | * | 8/2002 | Nakagawa et al. ............ | 62/430 |
| 2002/0002837 A1 | | 1/2002 | Shirota et al. | |

FOREIGN PATENT DOCUMENTS

| | | | | |
|---|---|---|---|---|
| IT | EP000554482 A1 | * | 8/1993 | .................. 62/356 |
| JP | A-01-153321 | | 6/1989 | |
| JP | 406211029 A | * | 8/1994 | .................. 237/11 |
| JP | 408192619 A | * | 7/1996 | ............ B60H/1/32 |
| JP | A-2000-38015 | | 2/2000 | |

* cited by examiner

*Primary Examiner*—William E. Tapolcai
*Assistant Examiner*—Mohammad M. Ali
(74) *Attorney, Agent, or Firm*—Harness, Dickey & Pierce, PLC

(57) ABSTRACT

A vehicle air conditioner allows storing cold thermal energy in a cold thermal energy storage unit during operation of a vehicle engine to be used later during an eco-run mode of a hybrid vehicle. Vehicle cabin air is cooled by the cold thermal energy quantity of a cold thermal energy storage unit when the vehicle engine is stopped and cold air continues to be requested by passengers. During engine operation, the cold thermal energy storage time, which is the time it takes for the temperature of the cold thermal energy storage unit to reach the solidifying point of the cold thermal energy storage material or lower, is measured. The stored cold thermal energy quantity of the cold thermal energy storage material during the operation of the vehicle engine is calculated based on information including the cold thermal energy storage time and cold air volumes.

7 Claims, 5 Drawing Sheets

VEHICLE AIR CONDITIONER THAT OPERATES DURING ENGINE STOPS

CROSS REFERENCE TO RELATED APPLICATION

This application is based upon, claims the benefit of priority of, and incorporates by reference the contents of prior Japanese Patent Application No. 2001-359586 filed Nov. 26, 2001.

BACKGROUND OF THE INVENTION

1. Technical Field of the Invention

The present invention relates to a cold thermal energy storage type vehicle air conditioner having a cold thermal energy storage unit cooled by cold air passed through a cooling evaporator, and the invention is applied to a vehicle whose vehicle engine, a driving source for a compressor is stopped when the vehicle stops moving.

2. Description of Related Art

Generally, for the purpose of environmental protection, a vehicle that automatically stops its engine when the vehicle stops moving, for example, to wait for a green light, has been commercially available. This vehicle is known as an eco-run or ecology running vehicle and an example of such a vehicle is a hybrid car. In the future, more vehicles are likely to exhibit the same engine stopping function when the vehicle stops.

In a vehicle's air conditioner, the compressor in the refrigeration cycle is driven by the vehicle engine, and therefore every time the above eco-run car stops moving, which stops the engine, the compressor also stops and the temperature in the cooling evaporator increases. This raises the temperature of air blown into the vehicle cabin, and reduces the comfort of the passengers as they cannot continue to feel cool enough because the increase in air temperature.

Therefore, there is an increasing demand for a cold thermal energy storage type vehicle air conditioner that includes a cold thermal energy storage unit. The cold thermal energy storage unit will store cold thermal energy during the operation of the compressor, and can cool air blown into the cabin by the cold thermal energy storage unit when the compressor is stopped (when the cooling function by the cooling evaporator stops).

SUMMARY OF THE INVENTION

This invention presents a cold thermal energy storage type vehicle air conditioner. If the cold thermal energy quantity stored in the cold thermal energy storage unit is small while the vehicle runs, there is only a short supply time for cooling air to be blown into the vehicle cabin at a comfortably low temperature when the engine is stopped. Therefore, the stored cold thermal energy quantity while the vehicle runs, that is, while the engine operates, must be known.

The invention is directed to a solution to the above problem. It is an object of the invention to provide a cold thermal energy storage type vehicle air conditioner that allows the quantity of cold thermal energy stored in the cold thermal energy storage unit during the operation of the vehicle engine to be accurately calculated. Another object of the invention is to provide a cold thermal energy storage type vehicle air conditioner that allows air conditioning control to be accurately carried out when the vehicle engine is stopped depending upon the stored quantity of cold thermal energy stored in the cold thermal energy storage unit.

In order to achieve the above object, according to a first aspect of the invention, in a vehicle air conditioner there is a cold thermal energy storage unit (40) provided on the downstream side of an evaporator (9) and cooled by cold air passed through the evaporator (9). The air blown into the cabin is cooled by a quantity of the stored cold thermal energy of the cold thermal energy storage unit (40) when the vehicle engine (4) is stopped. The cold thermal energy storage unit (40) has a cold thermal energy storage material (44) cooled and solidified by the cold air passed through the evaporator (9).

During the operation of the vehicle engine (4), the cold thermal energy storage time is measured. This is accomplished by measuring the time for the temperature of the cold thermal energy storage unit (40) to reach the solidifying point of the cold thermal energy storage material (44) or lower. The stored cold thermal energy quantity of the cold thermal energy storage material (44) during the operation of the vehicle engine (4) is calculated based on information including at least the cold thermal energy storage time and the volume of the cold air.

Meanwhile, cold thermal energy by latent heat is stored in response to the temperature of the cold thermal energy storage unit (40) reaching the solidifying temperature, or lower, of the cold thermal energy storage material (44). Therefore, the time after the temperature of the cold thermal energy storage unit (40) reaches the solidifying temperature, or lower, of the cold thermal energy storage material (44) and the volume of the cold air, are pieces of information most related to the cold thermal energy storage heat quantity of the cold thermal energy storage material (44). Therefore, the stored cold thermal energy quantity of the cold thermal energy storage material (44) is calculated based on information including at least the time after the temperature of the cold thermal energy storage unit (40) reaches the solidifying point, or lower, of the cold thermal energy storage material (44), i.e., the cold thermal energy storage time and the volume of cold air. Therefore, stored cold thermal energy quantity of the cold thermal energy storage material during the operation of the vehicle engine (4) can accurately be calculated.

Additionally, there is a temperature detecting means (32) for detecting the temperature of the evaporator (9) and a temperature detecting means (33) for detecting the temperature of the cold thermal energy storage unit (40). The stored cold thermal energy quantity is calculated based on the cold thermal energy storage time, the volume of the cold air, the temperature of the evaporator (9), and the temperature of the cold thermal energy storage unit (40).

Meanwhile, the stored cold thermal energy quantity of the cold thermal energy storage material (44) corresponds to the temperature of air of the cold thermal energy storage unit (40) before and after cold thermal energy storage. In other words, the quantity corresponds to the temperature difference before and after cold thermal energy storage. Therefore, the temperature difference between them (9, 10) based on the temperatures of the evaporator (9) and the cold thermal energy storage unit (40) is taken into consideration in calculating the stored cold thermal energy quantity of the cold thermal energy storage material, and therefore the stored cold thermal energy quantity can more accurately be calculated.

According to another aspect of the invention, in a vehicle air conditioner in which there is a cold thermal energy storage unit (40) provided on the air downstream side of an evaporator (9) and cooled by cold air passed through the evaporator (9), and air blown into the cabin is cooled by the stored cold thermal energy quantity of the cold thermal energy storage unit (40) when the vehicle engine (4) is stopped, the cold thermal energy storage unit (40) has a cold thermal energy storage material (44) cooled and solidified by the cold air passed through the evaporator (9). During operation of the vehicle engine (4), the cold thermal energy storage completion time, after the temperature of the cold thermal energy storage unit (40) reaches the solidifying point, or lower, of the cold thermal energy storage material (44), that is, until cold thermal energy storage to the cold thermal energy storage material (44) is completed, is pre-set for each air volume of cold air.

During operation of the vehicle engine (4), the time passed, after the temperature of the cold thermal energy storage unit (40) reaches the solidifying point, or lower, of the cold thermal energy storage material (44), is measured. The pre-set cold thermal energy storage completion time is selected based on the actual cold air volume after the temperature of the cold thermal energy storage unit (40) reaches the solidifying point, or lower, of the cold thermal energy storage material (44). The stored cold thermal energy quantity of the cold thermal energy storage material (44) during operation of the vehicle engine (4) is calculated based on the ratio of the passed time relative to the selected cold thermal energy storage completion time.

In this way, using the ratio between the time passed after the temperature of the cold thermal energy storage unit reaches the solidifying point, or lower, of the cold thermal energy storage material and the pre-set cold thermal energy storage completion time selected based on the air volume at the time, the stored cold thermal energy quantity of the cold thermal energy storage material (44) can accurately be calculated.

According to another aspect of the invention, in a vehicle air conditioner in which there is a cold thermal energy storage unit (40) provided on the downstream side of an evaporator (9) and cooled by cold air passed through the evaporator (9), air blown into the cabin is cooled by the stored cold thermal energy quantity of the cold thermal energy storage unit (40) when the vehicle engine (4) is stopped. The cold thermal energy storage unit (40) has a cold thermal energy storage material (44) cooled and solidified by the cold air passed through the evaporator (9).

A stored cold thermal energy quantity calculating means (S50) calculates the stored cold thermal energy quantity of the cold thermal energy storage material (44) during the operation of the vehicle engine (4). When the vehicle engine (4) is stopped, the volume of air blown into the cabin that can be cooled by cold thermal energy radiation of the cold thermal energy storage material (44) for a prescribed duration is calculated based on information including at least the stored cold thermal energy quantity and the duration, and the volume of air blown into the cabin, and is controlled to be the calculated air volume.

In this way, the volume of air blown into the cabin that can be cooled by cold thermal energy radiation of the cold thermal energy storage material (44) for a prescribed duration is calculated, and the volume of air blown into the cabin when the vehicle engine (4) is stopped is controlled to be the calculated air volume. Therefore, regardless of an increase or decrease in the stored cold thermal energy quantity when the vehicle engine (4) is stopped, the air volume corresponding to the actual stored cold thermal energy quantity is selected for cooling when the engine is stopped, so that cooling by cold thermal energy radiation of the cold thermal energy storage material (44) can be continued during the prescribed duration.

According to a fifth aspect of the invention said calculated air volume is calculated based on information including at least the stored cold thermal energy quantity, the duration, and the temperature of the air taken into the cold thermal energy storage unit (40). Since the stored cold thermal energy quantity of the cold thermal energy storage material (44) is affected by the temperature of the air taken into the cold thermal energy storage unit (40), the temperature of the intake air is taken into consideration in calculating said air volume, so that said air volume can more accurately be calculated.

According to a sixth aspect of the invention, when the vehicle engine (4) is stopped, an air volume manually set using an air conditioning control panel (36) or an air volume automatically set by automatic control is calculated as a first volume of air blown into the cabin, said calculated air volume is a second air volume, and the smaller air volume between the first and second air volumes is selected as the volume of air blown into the cabin when the vehicle engine (4) is stopped.

In this way, when the engine is stopped, and the first air volume is smaller than the second air volume, the air volume of air blown into the cabin is automatically set as the first air volume, the air volume by the operation of the passengers by their will or the air volume automatically set by auto control can be selected, so that the comfort of the passengers in relation with air conditioning when the engine is stopped can be improved.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

First Embodiment

Figure 1:
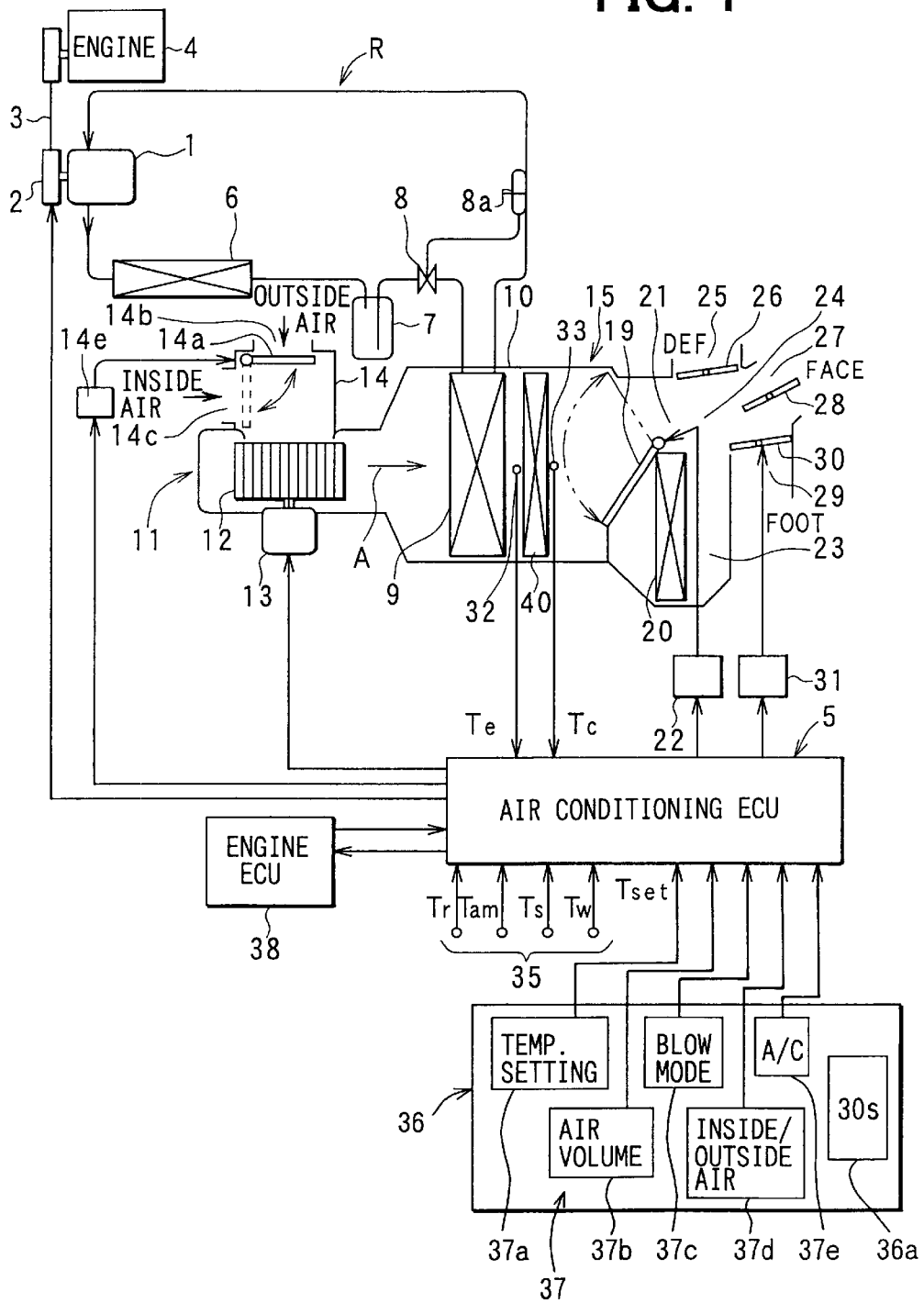
FIG. 1 is a general system diagram of a vehicle air conditioner according to a first embodiment of the invention.

FIG. 1 is a general view of a first embodiment, in which a refrigeration cycle R has a compressor 1 that intakes, compresses, and discharges a refrigerant, and the compressor 1 has an electromagnetic clutch 2 for connecting and disconnecting power. Power from a vehicle engine 4 is transmitted to the compressor 1 through the electromagnetic clutch 2 and a belt 3, and therefore the compressor 1 stops operating when electric power supplied to the electromagnetic clutch 2 is interrupted by an air conditioning electronic control unit 5.

A high temperature, high pressure heated refrigerant gas discharged from the compressor 1 flows into a condenser 6, is cooled by heat exchange with outdoor air blown by a cooling fan (not shown), and condensed. The refrigerant condensed by the condenser 6 passes into a liquid reservoir 7, in which the refrigerant is subjected to gas-liquid separation, and excess liquid refrigerant in the refrigeration cycle R is stored in the liquid reservoir 7.

The liquid refrigerant from the reservoir 7 has its pressure reduced by an expansion valve 8, which is a pressure reducing means, and attains a gas-liquid two-phase state. The expansion valve 8 is a temperature sensitive expansion valve having a temperature sensing portion 8a that senses the temperature of a refrigerant at the outlet of an evaporator 9 forming a heat exchanger for cooling. The low-pressure refrigerant from the expansion valve 8 flows into the evaporator 9. The evaporator 9 is provided in an air conditioning case 10 in the vehicle air conditioner, and the low pressure refrigerant having flowed into the evaporator 9 absorbs the heat of the air in the air conditioning case 10 and evaporates. The outlet of the evaporator 9 is coupled to the intake side of the compressor 1, and the above-described cycle components form a closed circuit.

In the air conditioning case 10, there is a blower 11 on the upstream side of the evaporator 9, and the blower 11 includes a centrifugal type blower fan 12 and a driving motor 13. An indoor/outdoor air switch box 14 is provided on the intake side of the blower fan 12. An indoor/outdoor air switch door 14a in the indoor/outdoor air switch box 14 opens and closes an outdoor air inlet 14b and an indoor air inlet 14c. In this way, outdoor air (air from outside the cabin) or indoor air (air from the cabin) is introduced into the indoor/outdoor air switch box 14. The indoor/outdoor air switch door 14a is driven by an electric driving unit 14e made of a servomotor.

In the air conditioner blowing system, an air conditioning unit 15 provided on the downstream side of the blower 11 is normally positioned inside an instrument board at the front in the cabin and in the center with respect to the vehicle width. The blower 11 is provided on the front passenger seat side as it is offset from the air conditioning unit 15. In the air conditioning case 10, on the downstream side of the evaporator 9, a cold thermal energy storage unit 40 and an air mix door 19 are sequentially provided. On the downstream side of the air mix door 19, a hot-water heater core 20, that heats air using hot water (cooling water) for the vehicle engine 4 as a heat source, is provided as a heat-exchanger for heating.

A bypath 21 to bypass the hot-water heater core 20 and flow air (cold air flow) is formed on a side (upper part) of the hot-water heater core 20. The air-mix door 19 is a pivotable plate door and is driven by an electric driving unit 22 of a servomotor.

The air mix door 19 controls the ratio of the volumes of the hot air through the hot-water heater core 20 and the cold air passed through the bypath 21. The temperature of air blown into the cabin is controlled by controlling this ratio of the volumes of hot air and cold air. Therefore, in this embodiment, the air mix door 19 forms the temperature control means for the air blown into the cabin. There is a hot air passage 23 on the downstream side of the hot-water heater core 20 extending upward from a lower side. As a result, hot air from the hot air passage 23 and cold air from the bypath 21 are mixed in an air mixing portion 24 and produce air at a desired temperature.

In the air conditioning case 10, there is a blow mode switch portion on the downstream side of the air mixing portion 24. More specifically, a defroster aperture 25 is formed at the upper surface of the air conditioning case 10, and the defroster aperture 25 blows air onto the inner surface of the vehicle front glass through a defroster duct (not shown). The defroster aperture 25 is opened and closed by a plate-shaped, pivotable defroster door 26.

There is a face aperture 27 formed at the upper surface of the air conditioning case 10 and in a position toward the rear side of the vehicle compared to the defroster aperture 25. Air is blown from the face aperture 27 toward the upper body portion of the passengers in the cabin through a face duct (not shown). The face aperture 27 is opened and closed by a pivotable, plate-shaped face door 28.

In the air conditioning case 10, there is a foot aperture 29 at the lower part of the face aperture 27, and air is blown from the foot aperture 29 to the footwell in the cabin. The foot aperture 29 is opened and closed by a pivotable, plate-shaped foot door 30. The blow mode doors 26, 28, and 30 are coupled to a common linking mechanism (not shown), and driven by an electric driving unit 31 of the servomotor through the linking mechanism.

The temperature sensor 32 for the evaporator 9 is provided immediately after the evaporator 9 in the stream of air blown from the evaporator 9 in the air conditioning case 10. The sensor 32 detects the evaporator blow temperature Te. Meanwhile, the temperature sensor 33 for the cold thermal energy storage unit 40 is provided immediately after the cold thermal energy storage unit 40 in the stream of air blown from the unit 40. The sensor 33 detects the blow temperature Tc of the cold thermal energy storage unit 40.

The blow temperature Te of the evaporator detected by the evaporator temperature sensor 32 is used for engaging/connecting and disengaging/disconnecting control of the electromagnetic clutch 2 of the compressor 1, or the discharge capacity control of the compressor 1, if the compressor 1 is of a variable displacement type, similar to standard air conditioners. The cooling capacity of the evaporator 9 and overall discharge capacity control is controlled by these clutch connections and disconnections. The cold thermal energy storage unit blow temperature Tc detected by the cold thermal energy storage temperature sensor 33 is used for controlling the opening of the air mix door 19. The opening of the air mix door 19 is corrected based on the value of the cold thermal energy storage unit blow temperature Tc. The values of the evaporator blow temperature Te and the cold thermal energy storage unit blow temperature Tc are also used for the purpose of calculating a cold thermal energy quantity stored in the cold thermal energy storage material of the cold thermal energy storage unit 40.

In addition to the above temperature sensors 32 and 33, detection output signals are input to the air conditioning electronic control unit 5 from a sensor group 35 to detect the indoor air temperature Tr, the outdoor air temperature Tam, the value of solar radiation Ts, the hot water temperature Tw, etc. for air conditioning control. An air conditioning control panel 36 provided near the instrument board in the cabin includes an operation switch group 37 that is manually operated by passengers. An operation signal from the operation switch group 37 is input to the air conditioning electronic control unit 5.

The operation switch group 37 includes a temperature setting switch 37a that generates a temperature setting signal Tset, an air volume switch 37b that generates an air volume switch signal, a blow mode switch 37c that generates a blow mode signal, an indoor/outdoor air switch 37d that generates an indoor/outdoor air switch signal, and an air-conditioner switch 37e that generates an on/off signal for the compressor 1 and the like. The blow mode switch 37c is used to manually switch the mode among well-known blow modes such as a face mode, a foot mode, a bi-level mode, a foot/defroster mode, and a defroster mode.

The air conditioning control panel 36 includes an indicator 36a that indicates a number representing the cold thermal energy storage remaining time during which the eco-run air conditioner can blow cool air inside the cabin using the cold thermal energy quantity stored in the cold thermal energy storage material of the cold thermal energy storage unit 40 when the engine is stopped. In other words, the length of time that the eco-run air conditioning can continue using cold thermal energy storage as an effective air conditioning means. The indicator 36a indicates the remaining time in terms of seconds, and in FIG. 1, 30s indicates that the stored cold thermal energy remaining time is 30 seconds.

The air conditioning electronic control unit 5 is connected with an engine electronic control unit 38, and a revolution number signal, a vehicle speed signal, and the like are input into the air conditioning electronic control unit 5 from the engine electronic control unit 38. As is well known, the engine electronic control unit 38 comprehensively controls the fuel injection amount to the vehicle engine 4, the ignition timing, and the like based on signals from a sensor group (not shown) to detect the operational state of the vehicle engine 4. In the eco-run vehicle such as a hybrid car to which the invention is applicable, when it is determined that the vehicle is to be in a stopped state based on the revolution number signal of the vehicle engine 4, a vehicle speed signal, a brake signal, and/or the like, the engine electronic control unit 38 automatically stops the vehicle engine 4 by interrupting the power supply to the ignition device or by stopping the fuel injection. After the engine is stopped, when the vehicle starts to move from the stopped state by the driving operations of the driver, the engine electronic control unit 38 determines from an axle signal or the like, that the vehicle is starting to move and automatically starts the vehicle engine 4. In the eco-run air conditioning mode after the vehicle engine 4 is stopped, the air conditioning electronic control unit 5 outputs a signal to request restarting of the engine when cooling by the stored cold thermal energy quantity of the cold thermal energy storage unit 40 cannot be maintained.

The air conditioning electronic control unit 5 and the engine electronic control unit 38 include a well-known microcomputer including a CPU, a ROM, a RAM and the like, and peripheral circuits thereof. The air conditioning electronic control unit 5 has a function to output engine control signals including a permission and non-permission signal for interrupting the vehicle engine 4, and a signal to request engine restarting after the engine is stopped. Additional functions include a function to calculate the stored cold thermal energy quantity during the engine operation period, the eco-run air conditioning electronic control function during the engine operation period, and normal air conditioning control functions during the operation of the engine such as the compressor connection and disconnection control, air volume control, air mix door control, indoor and outdoor air intake control, and blow mode control. Note that the air conditioning electronic control unit 5 and the engine electronic control unit 38 may be combined into one control unit.

A specific structure of the cold thermal energy storage unit 40 will now be described. With reference to FIG. 1, the cold thermal energy storage unit 40 has a shape whose front surface has the same area as that of the evaporator 9. The cold thermal energy storage unit 40 is in the form of a heat exchanger through which passes the entire volume of cold air passed through the evaporator 9. In other words, the entire volume of the air in the air conditioning case 10 passes through the evaporator 9 and the cold thermal energy storage unit 40. In this manner, the cold thermal energy storage unit 40 may be thin in direction A of the air flow in the air conditioning case 10.

Figure 2:
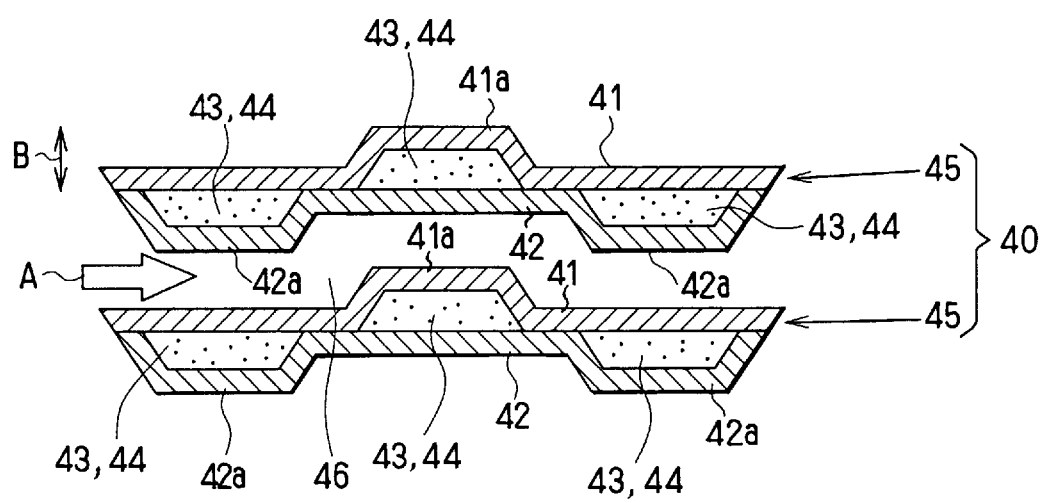
FIG. 2 is a cross-sectional view of a cold thermal energy storage unit 40 of FIG. 1.

FIG. 2 shows a specific structure of a heat exchanger for the cold thermal energy storage unit 40 by way of illustration. The raised surface portions 41a and 42a are alternately formed at two heat transfer plates 41 and 42, respectively, in the direction A of air (cold air) flow. The raised surface portions 41a and 42a abut against the planar portions of the heat transfer plates 41 and 42 on opposing sides of the plate and are joined by brazing. In other words, the raised portions 41a and 42a are located along opposite sides of the plate in an alternating fashion. In this way, a tube 45 having an enclosed space 43 inside the raised surface portions 41a and 42a is formed so that the cold thermal energy storage material 44 is enclosed in the enclosed space 43.

Note that in FIG. 2, the vertical direction along the surface of the sheet is the vertical direction in the arrangement of the cold thermal energy storage unit 40 in the air conditioning case 10. Therefore, the raised surface portions 41a and 42a of the heat transfer plates 41 and 42 and their inner enclosed space 43 extend in the vertical direction in the air conditioning case 10. Therefore, condensed water generated on the surfaces of the heat transfer plates 41 and 42 is allowed to drop due to gravity along the raised surface portions 41a and 41b.

Also in FIG. 2, only two sets of tubes 45 are shown, but in practice, the cold thermal energy storage unit 40 has a front surface whose area is the same as that of the evaporator 9. Therefore multiple sets of tubes 45 are provided sequentially, in a stacked fashion, in the direction of arrow B which is a direction orthogonal to the air flow direction A in FIG. 2.

Abutment portions are provided between the tubes 45 on the upper and lower end portions of the multiple sets of tubes 45 to maintain air passages 46 at prescribed intervals between the tubes 45. The abutment portions between the heat transfer plates 41, 42 of the tubes 45, and between the tubes 45 are integrally joined by brazing or the like, so that the cold thermal energy storage unit 40 as a whole can be integrated into a single heat exchanger structure.

The heat transfer plates 41 and 42 are preferably made of a thin aluminum sheet or plate, be light weight, and the like to facilitate heat transfer. Note that the brazing temperature for aluminum can be as high as 600° C., and therefore the cold thermal energy storage material 44 is enclosed in the enclosed space 43 after brazing of the cold thermal energy storage unit 40. In order to enclose the cold thermal energy storage material 44, the enclosed space 43 is provided with one or more filling openings, and the cold thermal energy storage material 44 is filled in the enclosed space 43 from the filling openings. Then, an appropriate sealing member (such as an O-ring) is interposed and a lid member is installed to achieve enclosure after the filling operation.

Note that more specifically, the cold thermal energy storage material 44 is preferably a material that solidifies (melting point) at a temperature from 6 to 8° C. in order to keep the evaporator 9 from frosting and prevents the material (aluminum) of the cold thermal energy storage unit from corroding. These conditions are satisfied by paraffin. Paraffin is superior to molten salt or other inorganic substances in terms of chemical stability, toxic nature, and the cost. The amount of paraffin used as the cold thermal energy storage material 44 is about 300 cc. According to the embodiment, paraffin having a solidifying point (melting point) of 8° C. is used as the cold thermal energy storage material 44.

In the above structure, the operation of the first embodiment will now be described. In the vehicle air conditioner, the compressor 1 is driven by the vehicle engine 4 so that the refrigeration cycle R is run by the compressor 1, and the temperature of the evaporator 9 is maintained in approximately a temperature of 3° C. to 5° C. by engaging and disengaging control of the compressor 1, so that the evaporator 9 is prevented from frosting.

In the evaporator 9, a low temperature, low pressure gas-liquid two-phase refrigerant reduced in pressure by the expansion valve 8 absorbs heat from air blown from the blower 11 and evaporates for cooling the blowing air. In other words, cold air is produced. The cold air is then directed through the air passages 46 of the cold thermal energy storage unit 40 at prescribed intervals between the multiple sets of tubes 45.

The cold air flow is interrupted or disturbed depending upon the arrangement of the air passages 46, and the heat transfer rate on the air side can thus significantly be improved. Therefore, the cold thermal energy storage material 44, which is normally paraffin, can effectively be cooled through the heat transfer plates 41 and 42 during the passage of the cold air through the air passages 46. As a result, the cold thermal energy storage material 44 is cooled and changes its state from a liquid phase at normal temperatures to a solid state. In this way, the cold thermal energy can be stored by solidifying latent heat, that is, by using the cool air to solidify the paraffin.

Therefore, in the vehicle that automatically stops the engine 4 when the vehicle stops to wait for a green light (when the engine power is not necessary), when the compressor 1 in the refrigeration cycle R stops as the vehicle stops, the temperature of the air blown into the cabin can be kept relatively low using the stored cold thermal energy quantity of the cold thermal energy storage material (paraffin) 44. Therefore, when the cabin is cooled during summertime, a rapid increase in the temperature of the air to be blown into the cabin is prevented. The permits the passengers to enjoy cool air and feel comfortable even when the engine is off, but awaiting starting.

Figure 3:
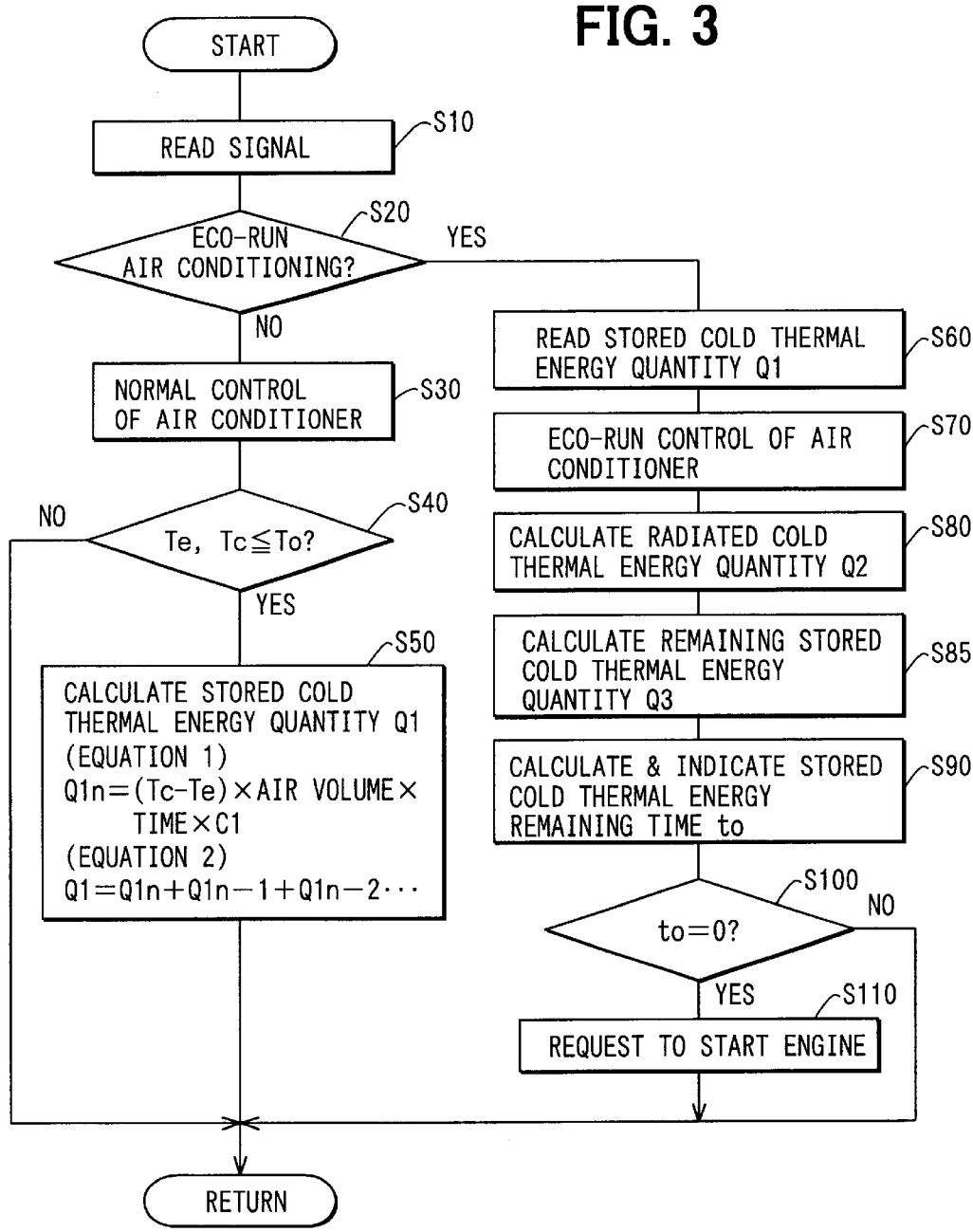
FIG. 3 is a flow chart illustrating air conditioning control according to the first embodiment.

Air conditioning control according to the first embodiment will specifically be described in conjunction with FIG. 3. The control routine in FIG. 3 is carried out by the air conditioning electronic control unit 5, and begins at the start of the air conditioning unit such when the blower 11 is activated. In step S10, an operation signal from the operation switch group 37 of the air conditioning control panel 36, a detection signal from the sensor group 35, an engine operation start signal from the engine electronic control unit 38, and a signal representing the vehicle running state are read.

At step S20 it is determined if the air conditioner is in the eco-run air conditioning mode. More specifically, the eco-run air conditioning mode is an air conditioning operation mode in which the air conditioner switch 37e of the air conditioning control panel 36 is on and the vehicle engine 4 is automatically stopped for example as the vehicle waits for a green light. Meanwhile, in the normal operation mode, the air conditioner switch 37e is on and the vehicle engine 4 and compressor 1 are operating.

In the normal air conditioning mode, the result of the determination in step S20 is NO, so the control proceeds to step S30, where the air conditioner is controlled by normal state control. More specifically, the compressor engagement and disengagement control (or the compressor capacity control), the air volume control, the air mix door control, the indoor and outdoor air intake control, the blow mode control, and the like are carried out by a well-known control method.

At step S40 it is determined whether the evaporator blow temperature Te detected by the temperature sensor 32 and the cold thermal energy storage unit blow temperature Tc detected by the temperature sensor 33 are both equal to or lower than the solidifying point To (8° C. in this embodiment) of the cold thermal energy storage material 44. By the determination in step S40, the point in time when the cold thermal energy storage material 44 starts to solidify and the latent heat cold thermal energy storage to the cold thermal energy storage material 44 is started is determined.

Figure 4:
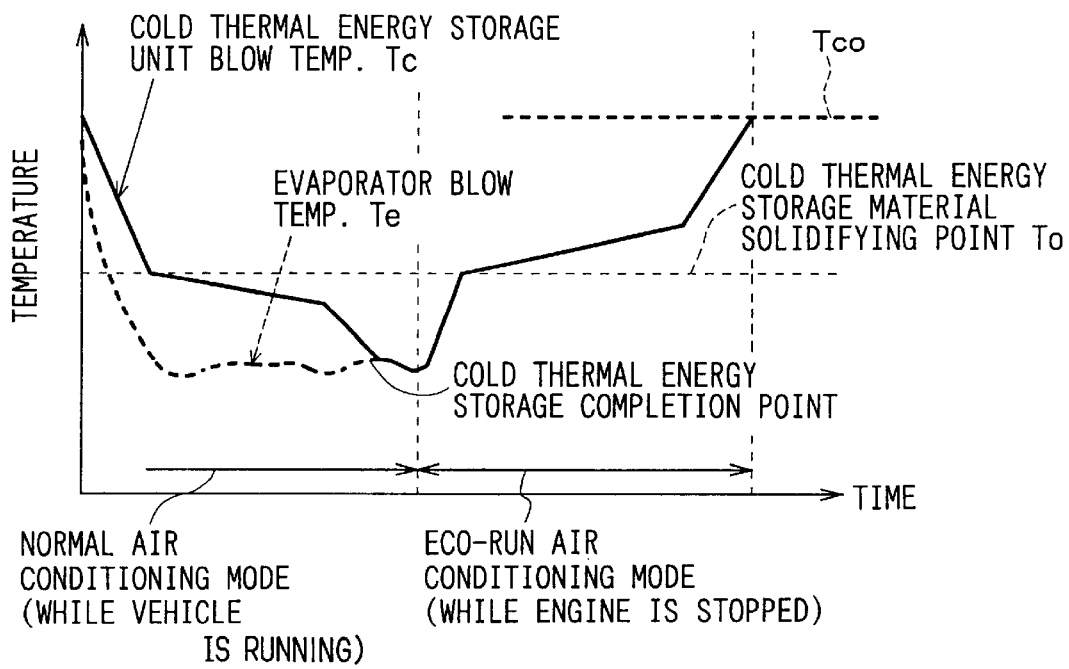
FIG. 4 is a graph showing the transition of evaporator blow air temperature Te and cold thermal energy storage unit blow air temperature Tc in a normal air conditioning mode and an eco-run air conditioning mode.

FIG. 4 is a graph showing the transition of the evaporator blow temperature Te and the cold thermal energy storage unit blow temperature Tc in the normal air conditioning mode and in the eco-run air conditioning mode. When the evaporator blow temperature Te and the cold thermal energy storage unit blow temperature Tc both reach the solidifying temperature To of the cold thermal energy storage material 44 or lower temperatures, the cold thermal energy storage material 44 starts to solidify. Therefore, the cold thermal energy storage unit blow temperature Tc is maintained at temperatures slightly lower than the solidifying temperature To. When the latent heat cold thermal energy storage to the cold thermal energy storage material 44 is complete, the cold thermal energy storage unit blow temperature Tc becomes lower than temperatures around the solidifying point To and reaches the evaporator blow temperature Te, thus completing the cold thermal energy storage.

Here, a cold thermal energy quantity Q1 stored in the cold thermal energy storage material 44 is a heat quantity, after both the temperatures Tc and Te are equal to or lower than the solidifying point To of the cold thermal energy storage material 44. The quantity Q1 is also dependent upon a cold thermal energy storage time, stored by the temperature difference (Tc−Te) of the cold thermal energy storage unit 40. The stored cold thermal energy quantity is also affected by the volume of cold air passed through the cold thermal energy storage unit 40, that is the volume of air blown into the cabin.

Therefore, the cold thermal energy quantity Q1 stored in the cold thermal energy storage material 44 can be calculated based on the above cold thermal energy storage time, the. temperature difference (Tc−Te) of the cold thermal energy storage unit 40 before and after cold thermal energy storage, and the volume of cold air. When it is determined in step S40 that Te and Tc are both not more than To, the cold thermal energy quantity Q1 stored in the cold thermal energy storage material 44 is calculated in the next step S50 by Equations 1 and 2. The stored cold thermal energy quantity Q1n is calculated at prescribed time intervals to for the prescribed time "to" by the following Equation 1.

Stored cold thermal energy quantity $Q1n=(Tc-Te) \times$ air volume $\times$ prescribed time "to" $\times C1$ [Equation 1]

Note that C1 is a correction coefficient in view of the heat transfer rate of the cold thermal energy storage unit 40, the solidifying latent heat of the cold thermal energy storage material 44 and the like.

The stored cold thermal energy quantity Q1n calculated for the prescribed time intervals "to" are each integrated into the following Equation 2, and based on the result of integration, the total stored cold thermal energy quantity Q1, i.e., the "stored cold thermal energy quantity Q1 immediately before the transition to the eco-run air conditioning mode" is calculated.

Stored cold thermal energy quantity $Q1=Q1n(1)+Q1n(2)+Q1n(3)$ [Equation 2]

Note that in Equation 2, the numbers in the parentheses represent ordinal numbers in calculations like the first time, the second time, the third time. When Tc=Te, the cold thermal energy storage to the cold thermal energy storage material 44 is complete, and therefore the integration of Q1n in Equation 2 ends when Tc=Te. The stored cold thermal energy quantity Qα at the end of the cold thermal energy storage can previously be calculated based on the solidifying latent heat (heat quantity per unit weight) of the cold thermal energy storage material 44 and the weight of the cold thermal energy storage material 44. Therefore, the integration of Q1n in Equation 2 may end when the calculated value for the stored cold thermal energy quantity Q1 reaches the "stored cold thermal energy quantity Qα at the end of the cold thermal energy storage" calculated in advance.

When the result of determination in step S40 is NO, latent heat cold thermal energy storage by solidification of the cold thermal energy storage material 44 cannot take place due to the conditions, and control returns to step S20.

Alternatively, when an eco-run air conditioning mode is determined in step S20, the control proceeds to step S60 and control under the eco-run air conditioning mode begins. To begin with, in step S60, the stored cold thermal energy quantity Q1 calculated in step S50 is read. The eco-run state control is carried out to the air conditioner in step S70. More specifically, air volume control, air mix door control, indoor and outdoor air intake control, blow mode control and the like in the eco-run air conditioning mode are carried out by a method according to the normal air conditioning mode.

In step S80, radiated cold thermal energy quantity Q2 from the cold thermal energy storage material 44 in the eco-run air conditioning mode is calculated. The radiated cold thermal energy quantity Q2 can be calculated from the following Equation 3 similarly to the case of the stored cold thermal energy quantity Q1.

Radiated cold thermal energy quantity $Q2=(Te-Tc) \times$ air volume $\times$ time passed after eco-run air conditioning $ta \times C2$ [Equation 3]

Note that the cooling function of the evaporator 9 is interrupted in the eco-run air conditioning mode, and therefore the evaporator blow temperature Te rises to the temperature of air taken in from the blower 11 in a short period after the start of the eco-run air conditioning mode. C2 is a correction coefficient similar to C1 in Equation 1. In step S85, the remaining stored cold thermal energy quantity Q3, in other words, the difference between stored cold thermal energy quantity Q1 and radiated cold thermal energy quantity Q2 (Q3=Q1−Q2) is calculated. In the following step S90, the stored cold thermal energy remaining time "to" is calculated. The radiated cold thermal energy quantity Q2' per unit time is then calculated. More specifically, the radiated cold thermal energy quantity Q2 calculated by Equation 3 is converted into a numerical value per second to obtain Q2'. The stored cold thermal energy remaining time "to" can be calculated as time in terms of seconds by dividing the remaining stored cold thermal energy quantity Q3 by the radiated cold thermal-energy quantity Q2' per second. More specifically, "to"=Q3/Q2'.

A signal for the stored cold thermal energy remaining time "to" is output to the indicator 36a of the air conditioning control panel 36, and the number (in seconds) of the cold thermal energy storage time "to" is indicated by the indicator 36a. In this way, passengers can be notified of the remaining time for eco-run air conditioning allowed by the cold thermal energy stored in the cold thermal energy storage unit 40.

It is determined in the next step S100 whether the stored cold thermal energy remaining time "to" is 0. When the stored cold thermal energy remaining time is zero (0), the control proceeds to step S110, and an operation request to the vehicle engine 4 is output to the engine electronic control unit 38, so that the vehicle engine 4 is automatically started. By this procedure, the eco-run air conditioning mode ends, the determination result in step S20 is NO and the normal air conditioning mode is resumed. Note that in FIG. 4, Tco represents a cold thermal energy storage unit blow temperature when the vehicle engine 4 is started after the end of the eco-run air conditioning mode. Tco is preferably approximately not more than 14° C. in order to secure the comfort of the passengers to make them feel cool enough and to prevent odors from being emitted from the evaporator 9.

Note that according to the first embodiment, in step S40, the point when the evaporator blow temperature Te and the cold thermal energy storage unit blow temperature Tc both reach the solidifying point To (8° C. in this embodiment) of the cold thermal energy storage material 44, or lower, is determined as the starting point of latent heat cold thermal energy storage to the cold thermal energy storage material 44. When the cold thermal energy storage unit blow temperature Tc is equal to or lower than the solidifying point To of the cold thermal energy storage material 44, as shown in FIG. 4, the evaporator blow temperature Te is also equal to or lower than the solidifying point To of the cold thermal energy storage material 44. Therefore, the determination in step S40 may be made based only on the cold thermal energy storage unit blow temperature Tc.

As can be seen from FIG. 4, when the evaporator blow temperature Te is lower than the solidifying point To of the cold thermal energy storage material 44 by a prescribed difference, the cold thermal energy storage unit blow temperature Tc is equal to or lower than the solidifying point To of the cold thermal energy storage material 44. Therefore, based on this correlation, the determination in step S40 may be made based only on the evaporator blow temperature Te.

In the above modification, the cold thermal energy quantity Q1 stored in the cold thermal energy storage material 44 is calculated based on the cold thermal energy storage time after the cold thermal energy storage unit blow temperature Tc becomes at least equal to or lower than cold thermal energy storage material solidifying point To, the temperature difference (Tc−Te) of the cold thermal energy storage unit 40 before and after cold thermal energy storage, and the volume of cold air. Additionally, the calculation process for the stored cold thermal energy quantity Q1 may be simplified as follows. More specifically, the discharge capability of the compressor 1 is controlled (the control of the operation ratio in continuation/interruption of the compressor 1, and the control of the discharge capacity of the compressor 1) so that the evaporator blow temperature Te upstream of the cold thermal energy storage unit 40 is normally fixed in the vicinity of 3° C. to 4° C. except for the transition period immediately after the start of cooling in order to prevent the evaporator 9 from frosting. Therefore, after Tc and Te are both equal to or lower than the solidifying point To of the cold thermal energy storage material, the ratio of the period, in which the evaporator blow temperature Te is kept substantially at a fixed level, is high. Stated differently, the ratio of the period, in which the temperature of air drawn through the cold thermal energy storage unit 40, kept substantially at a fixed level, is high.

The ratio of the period, in which the cold thermal energy storage unit blow temperature Tc is kept fixed near the cold thermal energy storage solidifying point To after the start of latent heat cold thermal energy storage, is increased. Therefore, the temperature difference (Tc–Te) of the cold thermal energy storage unit 40 before and after cold thermal energy storage can be set to a prescribed value (coefficient) determined by experiments in advance. In this way, only necessary input signals used to calculate a cold thermal energy quantity Q1 stored in the cold thermal energy storage material 44 can be reduced to only those of the cold thermal energy storage time and the air volume.

Second Embodiment

According to the first embodiment, the cold thermal energy quantity Q1 stored in the cold thermal energy storage material 44 is calculated by the above Equations 1 and 2 in step S50. When the cold thermal energy storage unit blow temperature Tc is equal to or lower than the solidifying point To of the cold thermal energy storage material, latent heat cold thermal energy storage to the cold thermal energy storage material 44 begins. Once the cold thermal energy storage unit blow temperature Tc is lowered to the evaporator blow temperature Te, it can be determined that the cold thermal energy storage to the cold thermal energy storage material 44 is complete. According to the second embodiment, the time tx, passed after the cold thermal energy storage unit blow temperature Tc reaches the solidifying point To or lower of the cold thermal energy storage material, is measured and the stored cold thermal energy quantity Q1 is calculated based on that passed time tx.

Figure 5:
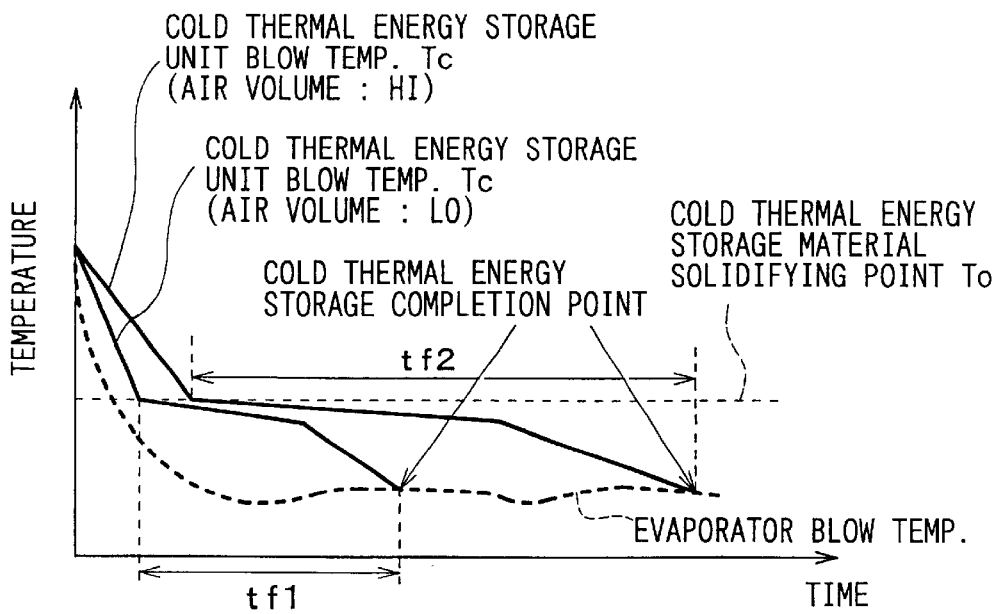
FIG. 5 is a graph showing the transition of evaporator blow air temperature and cold thermal energy storage unit blow air temperature Tc, showing the concept of how to calculate the stored cold thermal energy quantity according to a second embodiment.

FIG. 5 is a graph showing the concept of how to calculate the stored cold thermal energy quantity Q1 according to the second embodiment. The ratio of the period in which the evaporator blow temperature Te is kept substantially fixed is high except for the transition period immediately after the start of cooling, as described above, in order to prevent the evaporator 9 from frosting. Therefore the ratio of the period, in which the temperature of air drawn through the cold thermal energy storage unit 40 is kept substantially fixed, is high.

Therefore, after Tc reaches the solidifying point To, or lower, of the cold thermal energy storage material, time tf until Tc and Te are lowered to this temperature and the cold thermal energy storage is complete can be obtained in advance for each air volume. In FIG. 5, tf1 represents time until the end of cold thermal energy storage when the air volume is the minimum volume, Lo, while tf2 represents time until the end of cold thermal energy storage when the air volume is the maximum volume, Hi.

Meanwhile, the stored cold thermal energy quantity Qα at the end of the cold thermal energy storage can, in advance, be calculated based on the solidifying latent heat (heat quantity per unit weight) of the cold thermal energy storage material 44 and the weight of the cold thermal energy storage material 44. Therefore, time tf1, tf2 until the end of the cold thermal energy storage for each air volume obtained by experiments in advance and the stored cold thermal energy quantity Qα at the end of the cold thermal energy storage calculated in advance are stored in storage means in the control unit 5, and the passed time tx is measured. In this way, for the minimum air volume Lo, the stored cold thermal energy quantity Q1 at present, while the vehicle is moving, can be calculated as:

Stored cold thermal energy quantity Qa at the end of the cold thermal energy storage×(tx/tf1).

For the maximum air volume Hi, the stored cold thermal energy quantity Q1 at present while the vehicle is moving can be calculated as:

Stored cold thermal energy quantity Qα at the end of the cold thermal energy storage×(tx/tf2).

After Tc reaches the solidifying point To of the cold thermal energy storage material, times tf1, tf2 until the end of the cold thermal energy storage within the cold thermal energy storage material 44 ranges from about 40 seconds to about 80 seconds when the cold thermal energy storage material 44 has a volume of 300 cc. Therefore change in the air volume within time tf1 and tf2 is small in practice. Therefore, each of the air volumes for tf1 and tf2, of which times run until the end of cold thermal energy storage, may be an air volume when Tc is not more than the solidifying point To of the cold thermal energy storage material. The average value of the air volumes within the passed time tx may be calculated and time tf1, tf2 until the end of cold thermal energy storage can be selected using the average air volume value.

Third Embodiment

According to the first embodiment, in the control of the eco-run air conditioning mode from steps S60 to S110 in FIG. 3, the stored cold thermal energy remaining time "to" can be calculated based on the stored cold thermal energy quantity Q1 calculated during the operation of the vehicle engine 4 (while the vehicle is moving), and the value of the stored cold thermal energy remaining time "to" (seconds) is indicated at the indicator 36a of the air conditioning control panel 36. When the stored cold thermal energy remaining time "to" is zero, a request to start the vehicle engine 4 is output to the engine electronic control unit 38, and the vehicle engine 4 is automatically started. According to the third embodiment, the air volume control in the eco-run air conditioning control is carried out based on the stored cold thermal energy quantity Q1 calculated during the operation of the vehicle engine 4 (while the vehicle is moving).

Figure 6:
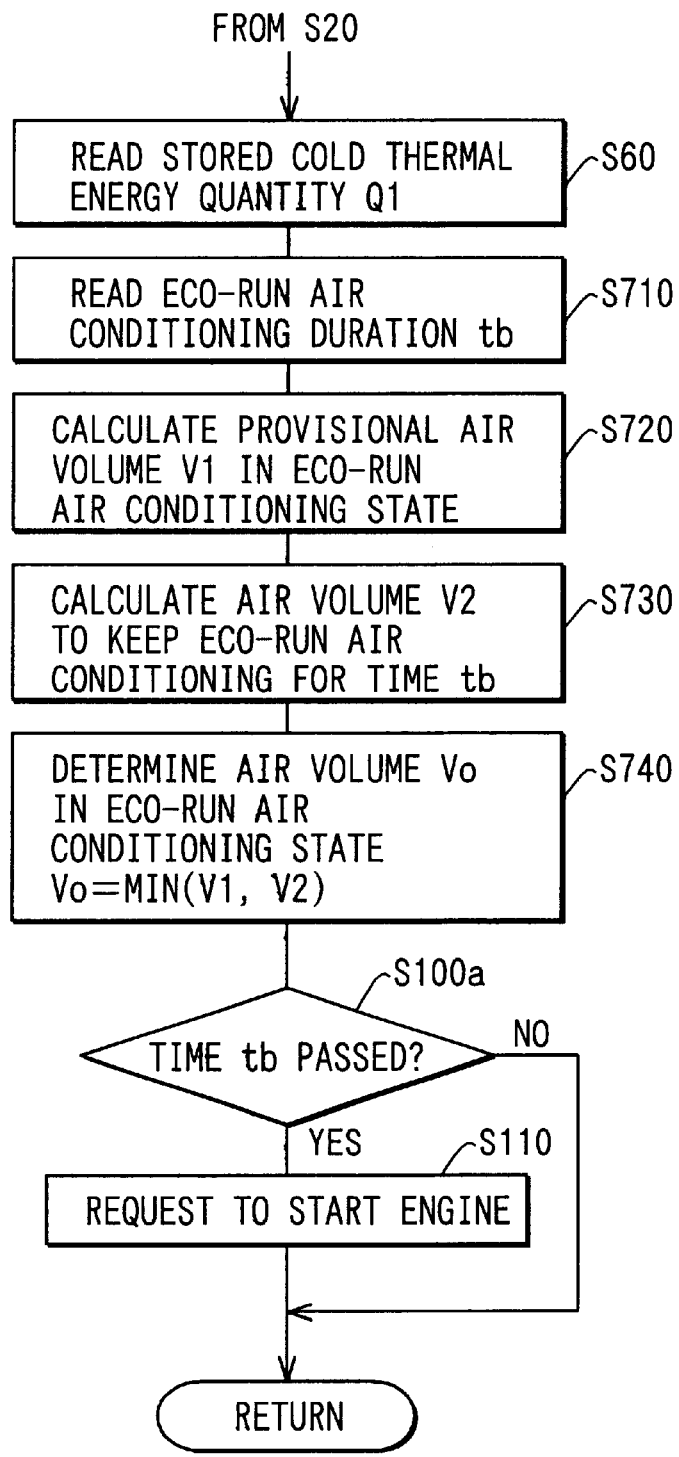
FIG. 6 is a flow chart illustrating air conditioning control in an eco-run air conditioning mode according to a third embodiment.

FIG. 6 is a flowchart for use in illustrating control in the eco-run air conditioning mode according to the third embodiment. In FIG. 6, steps S710 to S740 are for control of the air conditioner corresponding to step S70 in FIG. 3. The description of the third embodiment is specifically focused on the air volume control for the blower 11 among controls in the air conditioner. Other controls such as control of the opening of the air mix door 19 are the same as those of the conventional cases, and therefore will not be described.

In step S60, similar to the first embodiment, the stored cold thermal energy quantity Q1 calculated during the operation of the vehicle engine 4 (while the vehicle is moving) is read. Then in step S710, the duration tb of the eco-run air conditioning mode is read. The duration tb is a pre-set, prescribed time period stored in the storage means of the control unit 5. Since it is usually the case that the vehicle waits for a green light for one minute at most, the duration tb is set to one minute for example in view of the actual signal waiting time.

Then, in step S720, a provisional air volume V1 in the eco-run air conditioning mode is calculated based on a well-known method. More specifically, when the air volume is determined by auto control, the target blow temperature TAO of air blown into the cabin is calculated based on the set temperature Tset, the indoor air temperature Tr, the outdoor air temperature Tam, the value of solar radiation Ts, etc. in the temperature setting switch 37a. The calculation is carried out so that the lower the target blow temperature TAO is, the larger the provisional air volume V1 becomes.

When the air volume switch 37b is manually operated by the passenger and the air volume is indicated by manual operation, the air volume by manual operation using the air volume switch 37b is set as the provisional air volume V1.

Then in step S730, with the stored cold thermal energy quantity Q1 stored during the operation of the vehicle engine 4 (while the vehicle is moving), the air volume V2 to maintain the eco-run air conditioning for the above duration tb is calculated. How to calculate the air volume V2 will now be described more specifically. The radiated cold thermal energy quantity Q2 during the duration tb can be described by the following Equation 4:

$$\text{Radiated cold thermal energy quantity } Q2 = (Te-Tc) \times \text{air volume } V2 \times \text{duration } tb \times C2 \qquad [\text{Equation 4}]$$

C2 is a correction coefficient similar to C2 in Equation 3.

Therefore, the air volume V2 can be calculated by Equation 5 as follows:

$$V2 = Q1 / \{(Te-Tc) \times tb \times C2\} \qquad [\text{Equation 5}]$$

Note that Te and Tc in Equation 5 represent temperatures of air drawn across the cold thermal energy storage unit during the beginning of the eco-run air conditioning mode. Tc can be regarded as a fixed temperature determined by the solidifying point To of the cold thermal energy storage material, and therefore only Te representing the temperature of air drawn across the cold thermal energy storage unit is input in Equation 5 to calculate the air volume V2 without inputting Tc.

Then in step S740, the smaller value of the provisional air volume V1 and the air volume V2 determined by the stored cold thermal energy quantity Q1 and the radiated cold thermal energy quantity Q2, is finally determined as the air volume Vo during eco-run air conditioning. More specifically, when the temperature Te of air drawn across the cold thermal energy storage unit during eco-run air conditioning is low and the cooling load is small, the air volume V1 can be smaller than the air volume V2. In the case, the air volume V1 is selected to carry out the eco-run air conditioning mode, so that the air conditioning can be carried out in the cabin with the air volume appropriately corresponding to the air conditioning environmental conditions.

In contrast, when the temperature Te of air drawn across the cold thermal energy storage unit during eco-run air conditioning is high and the cooling load is high, the air volume V2 is smaller than the air volume V1. In that case, the air volume V2 is selected to carry out the eco-run air conditioning mode, so that eco-run air conditioning can be continued during the predetermined duration tb (one minute for example).

The next step S100a corresponds to step S100 according to the first embodiment, and it is determined in the step whether the time duration tb is passed. When the duration tb passes, the control proceeds to step S110. At step S110, a request to start the vehicle engine 4 is output to the engine electronic control unit 38, and the vehicle engine 4 is automatically started. In this way, the eco-run air conditioning mode ends, the result of the determination in step S20 is NO, and the control proceeds to the normal air conditioning mode control.

Other Embodiments

Note that according to the third embodiment, the duration tb of the eco-run air conditioning mode is fixed to a prescribed value. However, in the future with such eco-run air conditioning technology, it is perceived that it will be possible to communicate road information, such as how many seconds longer it will take before a traffic signal turns to green from red, to the vehicle's computer from an outdoor road information generation unit. Therefore, when road information generation units of this kind are actually widely provided and information is sent from the road information generation units, the duration tb may be varied based on the actual remaining time until the signal is switched from red to green.

In Equations 1 and 3 according to the first embodiment, in calculating the cold thermal energy quantity Q1 stored in the cold thermal energy storage material 44 and the radiated cold thermal energy quantity Q2n to the cold thermal energy storage material 44, the temperature difference (Tc-Te) of the cold thermal energy storage unit 40 before and after cold thermal energy storage is used. Meanwhile, Tc can be regarded as a fixed temperature determined by the solidifying temperature To of the cold thermal energy storage material as described in connection with Equation 5 according to the third embodiment. Therefore, also in Equations 1 and 3, Te alone may be input to calculate the stored cold thermal energy quantity Q1 and the radiated cold thermal energy quantity Q2n without inputting Tc.

In the above embodiments, as the temperature detecting means for the evaporator 9 and the cold thermal energy storage unit 40, temperature sensors 32 and 33 for detecting the blow air temperature of the evaporator 9 and the cold thermal energy storage unit 40 are provided. Meanwhile, temperature sensors for detecting surface temperatures or the like of the evaporator 9 and the cold thermal energy storage unit 40 may be used as the temperature detecting means for the evaporator 9 and the cold thermal energy storage unit 40.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle air conditioner operating according to a refrigeration cycle when a vehicle engine is not operating, the air conditioner comprising:

a compressor driven by the vehicle engine;

an evaporator provided as part of the refrigeration cycle, wherein said compressor and said evaporator are for cooling air blown into a vehicle interior; and a cold thermal energy storage unit provided downstream side of said evaporator in an air path and cooled by cold air passed through said evaporator, wherein air blown into the cabin is cooled by a stored cold thermal energy quantity from said cold thermal energy storage unit when the vehicle engine is stopped, the cold thermal energy storage unit has a cold thermal energy storage material cooled and solidified by the cold air passed through said evaporator, during the operation of said vehicle engine, a cold thermal energy storage time after a temperature of said cold thermal energy storage unit reaches a solidifying point of said cold thermal energy storage material or lower until cold thermal energy storage to said cold thermal energy storage material is carried out is measured, the stored cold thermal energy quantity of said cold thermal energy storage material during the operation of said vehicle engine is calculated based on at least said cold thermal energy storage time and a volume of said cold air.

2. The vehicle air conditioner according to claim 1, further comprising:

a temperature detecting means for detecting a temperature of said evaporator; and a temperature detecting means for detecting the temperature of said cold thermal energy storage unit, wherein said stored cold thermal energy quantity is calculated based on said cold thermal energy storage time, said volume of said cold air, said temperature of said evaporator, and said temperature of said cold thermal energy storage unit.

3. A vehicle air conditioner that is mounted on a vehicle, which carries out control to stop a vehicle engine when power of the vehicle engine is not necessary, the air conditioner comprising:

a compressor driven by the vehicle engine;

an evaporator provided in a refrigeration cycle having said compressor for cooling air blown into a vehicle cabin; and a cold thermal energy storage unit provided on a downstream side of said evaporator and cooled by cold air passed through said evaporator, wherein air blown into the cabin being cooled by a stored cold thermal energy quantity of said cold thermal energy storage unit when said vehicle engine is stopped, said cold thermal energy storage unit having a cold thermal energy storage material cooled and solidified by the cold air passed through said evaporator, during the operation of said vehicle engine, a cold thermal energy storage completion time after a temperature of said cold thermal energy storage unit reaches a solidifying point of said cold thermal energy storage material, or lower, until cold thermal energy storage to said cold thermal energy storage material is completed is pre-set for each air volume of said cold air, during the operation of the vehicle engine, the time passed after the temperature of said cold thermal energy storage unit reaches a solidifying point of said cold thermal energy storage material or lower is measured, said pre-set cold thermal energy storage completion time is selected based on an actual cold air volume after said temperature of said cold thermal energy storage unit reaches a solidifying point of said cold thermal energy storage material (44), or lower, and said stored cold thermal energy quantity of said cold thermal energy storage material during the operation of said vehicle engine is calculated based on a ratio of said passed time relative to said selected cold thermal energy storage completion time.

4. A vehicle air conditioner to be mounted on a vehicle that carries out control to stop a vehicle engine when power of said vehicle engine is not necessary, comprising:

a compressor driven by said vehicle engine;

an evaporator provided in a refrigeration cycle having said compressor for cooling air blown into a vehicle cabin; and a cold thermal energy storage unit provided at a downstream air location of said evaporator and cooled by cold air passed through said evaporator, wherein air blown into said vehicle cabin is cooled by a stored cold thermal energy quantity of said cold thermal energy storage unit when said vehicle engine is stopped, said cold thermal energy storage unit has a cold thermal energy storage material cooled and solidified by said cold air passed through said evaporator, a stored cold thermal energy quantity calculating means calculates the stored cold thermal energy quantity of said cold thermal energy storage material during the operation of said vehicle engine, when said vehicle engine is stopped, a volume of air blown into the cabin that can be cooled by cold thermal energy radiation of said cold thermal energy storage material for a prescribed duration is calculated based on information including at least said stored cold thermal energy quantity and said duration, the volume of air blown into said vehicle cabin when said vehicle engine is stopped is controlled to be said calculated air volume.

5. The vehicle air conditioner according to claim 4, wherein said calculated air volume is based on at least said stored cold thermal energy quantity, said duration, and a temperature of air drawn through said cold thermal energy storage unit.

6. The vehicle air conditioner according to claim 4, wherein when said vehicle engine is stopped, an air volume manually set using an air conditioning control panel, or an air volume automatically set by automatic control, is calculated as a first volume of air blown into the cabin, said calculated air volume is a second air volume, and the smaller air volume of said first and second air volumes is selected as said volume of air blown into the cabin when the vehicle engine is stopped.

7. The vehicle air conditioner according to claim 5, wherein when said vehicle engine is stopped, an air volume manually set using an air conditioning control panel, or an air volume automatically set by automatic control, is calculated as a first volume of air blown into the cabin, said calculated air volume is a second air volume, and the smaller air volume of said first and second air volumes is selected as said volume of air blown into the cabin when the vehicle engine is stopped.

* * * * *